(12) United States Patent
Hirayama et al.

(10) Patent No.: US 9,850,946 B2
(45) Date of Patent: Dec. 26, 2017

(54) BEARING BUSH FOR USE IN TOGGLE

(71) Applicant: OILES CORPORATION, Tokyo (JP)

(72) Inventors: Maki Hirayama, Fujisawa (JP); Taku Watakabe, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 15/329,446

(22) PCT Filed: Jul. 22, 2015

(86) PCT No.: PCT/JP2015/003681
§ 371 (c)(1),
(2) Date: Jan. 26, 2017

(87) PCT Pub. No.: WO2016/017119
PCT Pub. Date: Feb. 4, 2016

(65) Prior Publication Data
US 2017/0211622 A1 Jul. 27, 2017

(30) Foreign Application Priority Data

Jul. 28, 2014 (JP) .................................. 2014-152989

(51) Int. Cl.
*F16C 33/10* (2006.01)
*B29C 45/66* (2006.01)
*F16C 17/02* (2006.01)

(52) U.S. Cl.
CPC ........ *F16C 33/1095* (2013.01); *B29C 45/661* (2013.01); *F16C 17/02* (2013.01)

(58) Field of Classification Search
CPC ............................. F16C 33/10; F16C 33/1095
(Continued)

(56) References Cited

U.S. PATENT DOCUMENTS 2,431,430 A * 11/1947 Shaw ...................... F16C 33/24
384/285
4,773,845 A 9/1988 Nagura et al.
(Continued)

FOREIGN PATENT DOCUMENTS

JP 55-112120 8/1980
JP 57-159027 10/1982
(Continued)

OTHER PUBLICATIONS

International Search Report for PCT/JP2015/003681, dated Oct. 13, 2015, 3 pages.

*Primary Examiner* — Thomas R Hannon
(74) *Attorney, Agent, or Firm* — Nixon & Vanderhye P.C.

(57) ABSTRACT

A bearing bush 1 for use in a toggle has a cylindrical metallic base material 2 and a solid lubricant 3 embedded in the metallic base material 2, and the metallic base material 2 has dead end grooves 5 formed in a cylindrical inner peripheral surface 4, an annular groove 6 formed in the cylindrical inner peripheral surface 4, and circular holes 7a and 7b as well as 7c and 7d formed in each of a pair of semicylindrical inner peripheral surfaces 4a and 4b adjacent to each other in an axial direction X and two pairs of semicylindrical inner peripheral surfaces 4c and 4d sandwiching the pair of semicylindrical inner peripheral surfaces 4a and 4b in a circumferential direction R and adjacent to each other in the axial direction X in each pair.

20 Claims, 5 Drawing Sheets

(58) Field of Classification Search
USPC .......................................................... 384/285
See application file for complete search history.

(56) References Cited

U.S. PATENT DOCUMENTS

| | | | |
|---|---|---|---|
| 5,290,617 | A | 3/1994 | Mochizuki et al. |
| 5,322,372 | A * | 6/1994 | You .................. F16C 33/14 384/285 |
| 6,896,411 | B2 | 5/2005 | Lee |
| 7,470,065 | B2 * | 12/2008 | Stadlmayr .............. B21D 53/10 384/284 |
| 9,222,511 | B2 * | 12/2015 | Lee ....................... F16C 33/103 |

FOREIGN PATENT DOCUMENTS

| | | |
|---|---|---|
| JP | 6-65429 | 8/1994 |
| JP | 7-68974 | 7/1995 |
| JP | 10-159851 | 6/1998 |
| JP | 2007-253351 | 10/2007 |

* cited by examiner

US 9,850,946 B2

BEARING BUSH FOR USE IN TOGGLE

This application is the U.S. national phase of International Application No. PCT/JP2015/003681 filed 22 Jul. 2015, which designated the U.S. and claims priority to JP Patent Application No. 2014-152989 filed 28 Jul. 2014, the entire contents of each of which are hereby incorporated by reference.

TECHNICAL FIELD

The present invention relates to a bearing bush for use in a toggle which is suitably incorporated in a toggle mechanism in a mold clamping apparatus of an injection molding machine.

BACKGROUND ART

The injection molding machine is adapted such that, in a state is which the mold is closed by the mold clamping apparatus and a large mold clamping force is being applied to the mold, a high-pressure resin is injected and filled into the cavity of the mold from an injection apparatus, and a resin molding is taken out from the widely opened mold after cooling and solidifying to produce resin moldings of a desired shape. Such a mold clamping apparatus is required to have functions of performing opening and closing operation of the mold in a short time and applying a large mold clamping force to the mold. As one of such mold clamping apparatuses, a toggle type mold clamping apparatus having a toggle link mechanism shown in Patent Document 1 is widely used.

The toggle link mechanism in the toggle type mold clamping apparatus is provided with a plurality of joint portions between a fixed platen and a movable platen. In the bearing bush used in such a joint portion, an equal load is not necessarily applied to the entire circumference of its cylindrical inner peripheral surface, and in an initial stage of mold closing of the movable platen, i.e., in an early period of movement toward mold closing from the open mold state, the speed of the movable platen is fast and the mold closing force is small, so that a large load is not applied to the cylindrical inner peripheral surface of the bearing bush; however, as the completion of mold closing approaches, the speed of the movable platen abruptly decreases, and the mold closing force of the movable platen increases remarkably, and therefore a large load is applied to the cylindrical inner peripheral surface of the bearing bush. The range of the cylindrical inner peripheral surface to which this large load is applied is approximately one-third of the entire circumference of the inner peripheral surface of the bearing bush.

PRIOR ART DOCUMENTS

Patent Documents

Patent Document 1: JP-B-6-65429
Patent Document 2: JP-A-10-159851
Patent Document 3: JP-A-2007-253351

SUMMARY OF THE INVENTION

Problems that the Invention is to Solve

Incidentally, Patent Document 2 proposes a sliding bearing consisting of a metallic base material in which a solid lubricant is embedded, however, in such a sliding bearing which utilizes the lubricating action on the sliding surface of the solid lubricant embedded in the metallic base material, if the ratio of embedment of the solid lubricant in a region where high surface pressure acts is made smaller than in other regions or zero, unless a lubricating film of the solid lubricant is instantly formed on the sliding surface, a considerable number of sliding (swinging motion) is needed until the lubricating film is formed. Hence, there is a possibility that trouble such as seizure ascribable to high-friction sliding can occur until the lubricating film is formed.

Patent Document 3 proposes a toggle type mold clamping apparatus comprised of a bearing bush in which a solid lubricant is provided in a region (pressure receiving surface at the time of operation) where pressing action from a pin is received at the time of mold clamping, and the solid lubricant is not provided in a region (pressure non-receiving surface at the time of operation) where pressing action from the pin is not received at the time of mold clamping and of a grease supplying means for supplying grease to contact surfaces of the bush and the pin. However, even in the region where the pressing action from the pin is not received at the time of mold clamping, it is not that such a region does not slide at all, but sliding is naturally accompanied, so that it cannot be said that sufficient lubrication can be provided by only grease as the lubricant. In addition, the provision of a region not including the solid lubricant in the bearing bush can possibly generate a distortion in the overall bearing bush, and a problem can possibly occur in the roundness of the bearing bush.

The present invention has been devised in view of the above-described aspects, and its object is to provide a bearing bush for use in a toggle and with a solid lubricant embedded therein, which excels in the capability of forming a lubricating film on its relative rotational sliding surface with the pin even in slight rotational motion in the region where a large load from the pin acts due to a remarkable increase in the mold closing force at the time of mold clamping, thereby making it possible to effect smooth relative rotation without causing a trouble such as seizure.

Means for Solving the Problems

In accordance with the present invention, a bearing bush for use in a toggle and interposed between a pin and a pair of links of a toggle type mold clamping apparatus equipped with a toggle link mechanism having at least the pair of links and the pin for coupling the pair of links relatively rotatably, comprises: a cylindrical metallic base material; and a solid lubricant embedded in the metallic base material, wherein the metallic base material has a plurality of circular holes formed in at least a first semicylindrical inner peripheral surface between the first semicylindrical inner peripheral surface and a second semicylindrical inner peripheral surface which are formed by dividing a cylindrical inner peripheral surface of the metallic base material into three parts in a circumferential direction and dividing the same into two parts in an axial direction, and which are adjacent to each other in the axial direction, a solid lubricant having an exposed surface exposed at the first semicylindrical inner peripheral surface being embedded in each of the plurality of circular holes, and wherein, if the cylindrical inner peripheral surface is developed into a plane, each of the plurality of circular holes has a center at a respective vertex of each of a plurality of virtual rhombuses formed by a plurality of first virtual line segments which are inclined in one direction at a predetermined first angle with respect to a circumferential line perpendicular to the axial direction and extending in the circumferential direction, and extend in parallel in such a manner as to be spaced apart from each other with a predetermined first interval, and by a plurality of second virtual line segments which are inclined in a symmetrically opposite direction to the one direction about the circumferential line at the first angle with respect to the circumferential line in such a manner as to intersect the first virtual line segments, and extend in parallel in such a manner as to be spaced apart from each other with the first interval, each of the plurality of circular holes having a radius which is greater than one-fourth of a length of an axial diagonal line between diagonal lines of the rhombus and is smaller than one-half of a length of a side of the rhombus.

According to the bearing bush for use in a toggle in accordance with the present invention, if the bearing bush is disposed with respect to the pin in such a way as to allow the first semicylindrical inner peripheral surface to receive the remarkably large load from the pin which is generated due to an increase in the mold closing force at the time of mold clamping, since, in such a first semicylindrical inner peripheral surface, the centers of the plurality of circular holes, in which the solid lubricant having the exposed surface exposed at the first semicylindrical inner peripheral surface is embedded, are positioned at the respective vertices of the plurality of virtual rhombuses, and each of the plurality of circular holes has a radius which is greater than one-fourth of the length of an axial diagonal line between the diagonal lines of the rhombus and is smaller than one-half of the length of each side of the rhombus, the lubricating film of the solid lubricant is easily formed on the first semicylindrical inner peripheral surface in the relative rotational sliding in a range of ±5° or thereabouts with the pin (shaft member) under a high load, so that stable mold clamping operation can be effected without causing a trouble such as the seizure of the metallic base material onto the pin. Moreover, as axial grooves and a circumferential groove are formed on the cylindrical inner peripheral surface and are used as reservoirs for the lubricant such as grease, the lubricating action based on the lubricant in the reservoirs can be expected on the first semicylindrical inner peripheral surface in addition to the lubricating action based on the solid lubricant. Hence, the large load from the pin can be smoothly supported by the first semicylindrical inner peripheral surface.

In the bearing bush in accordance with the present invention, if the cylindrical inner peripheral surface is developed into a plane, each of one first virtual line segment of the plurality of first virtual line segments and one second virtual line segment of the plurality of second virtual line segments may pass through a circumferentially central point of the first semicylindrical inner peripheral surface on the circumferential line. If one each of the first and second virtual line segments thus passes through the central point, the center of each of the plurality of circular holes with the solid lubricant embedded therein is positioned on a line passing through the central point and extending in the axial direction, with the result that a maximum load from the pin can be received by the solid lubricant itself embedded in the circular holes, and it is possible to attain the formation of a lubricating film of the solid lubricant on the first semicylindrical inner peripheral surface easily and uniformly in the circumferential direction.

In the present invention, circumferentially mutually adjacent ones of the plurality of circular holes may preferably be partially overlapped in the circumferential direction with an axially overlapping allowance, and such an overlap makes it possible to form a lubricating film of the solid lubricant uniformly in the circumferential direction on the first semicylindrical inner peripheral surface in a range of the relative rotational sliding of ±5° or thereabouts between the pin and the cylindrical inner peripheral surface.

The metallic base material in accordance with the present invention may further have a plurality of circular holes which are formed in the second semicylindrical inner peripheral surface and in which the solid lubricant having an exposed surface exposed at the second semicylindrical inner peripheral surface is embedded. In this case, if the cylindrical inner peripheral surface is developed into a plane, the plurality of circular holes in the first semicylindrical inner peripheral surface and the plurality of circular holes in the second semicylindrical inner peripheral surface may be respectively arranged symmetrically about the circumferential line, or may alternatively be arranged point symmetrically with respect to the circumferentially central point of a respective one of the first and second semicylindrical inner peripheral surfaces on the circumferential line. Since, in the same way as the first semicylindrical inner peripheral surface, the second semicylindrical inner peripheral surface is thus also provided with the plurality of circular holes with the solid lubricant embedded therein, the high load from the pin can be received in a shared manner by the first and second semicylindrical inner peripheral surfaces with the lubricating films formed thereon, thereby making it possible to effect further stable mold clamping operation.

In the present invention, in a preferred example, circumferentially mutually adjacent ones of the plurality of circular holes formed in the second semicylindrical inner peripheral surface may be partially overlapped in the circumferential direction with an axially overlapping allowance, and such an overlap makes it possible to form a lubricating film of the solid lubricant uniformly in the circumferential direction also on the second semicylindrical inner peripheral surface in a range of the relative rotational sliding of ±5° or thereabouts between the pin and the cylindrical inner peripheral surface.

In the present invention, the metallic base material may further have a plurality of other circular holes formed in at least a third semicylindrical inner peripheral surface between at least one axially adjacent pair of the third semicylindrical inner peripheral surface and a fourth semicylindrical inner peripheral surface among the third to a sixth semicylindrical inner peripheral surface which are formed in such a manner as to sandwich the first and second semicylindrical inner peripheral surfaces in the circumferential direction and by dividing the cylindrical inner peripheral surface of the metallic base material into three parts in the circumferential direction and dividing the same into two parts in the axial direction, the solid lubricant having an exposed surface exposed at the third semicylindrical inner peripheral surface being embedded in each of the plurality of other circular holes. In this case, if the cylindrical inner peripheral surface is developed into a plane, each of the plurality of other circular holes may have a center at a respective vertex of each of a plurality of second virtual rhombuses formed by a plurality of third virtual line segments which are inclined in the one direction at a predetermined second angle with respect to the circumferential line and extend in parallel in such a manner as to be spaced apart from each other with a predetermined second interval which is 1.5 to 2 times the predetermined first interval, and by a plurality of fourth virtual line segments which are inclined in a symmetrically opposite direction to the one direction about the circumferential line at the second angle with respect to the circumferential line in such a manner as to intersect the third virtual line segments, and extend in parallel in such a manner as to be spaced apart from each other with the second interval, Further, each of the plurality of other circular holes may have a radius which is greater than one-fourth of a length of an axial diagonal line between diagonal lines of the second rhombus and is smaller than one-half of a length of a side of the second rhombus. In addition, the metallic base material may further have a plurality of other circular holes which are formed in the fourth semicylindrical inner peripheral surface and in which the solid lubricant having an exposed surface exposed at the fourth semicylindrical inner peripheral surface is embedded, and in this case, if the cylindrical inner peripheral surface is developed into a plane, the plurality of other circular holes in the third semicylindrical inner peripheral surface and the plurality of other circular holes in the fourth semicylindrical inner peripheral surface may be respectively arranged symmetrically about the circumferential line or point symmetrically with respect to the circumferentially central point of a respective one of the third and fourth semicylindrical inner peripheral surfaces.

If the metallic base material is thus further provided with a plurality of other circular holes in which the solid lubricant having an exposed surface exposed at at least one of the third semicylindrical inner peripheral surface and the fourth semicylindrical inner peripheral surface is embedded, in a case where the first semicylindrical inner peripheral surface or the first semicylindrical inner peripheral surface and the second semicylindrical inner peripheral surface are adapted to receive a remarkably large load from the pin occurring due to an increase in the mold closing force at the time of mold clamping, even in the event that the relative rotational sliding with respect to the pin has occurred on at least one of the third semicylindrical inner peripheral surface and the fourth semicylindrical inner peripheral surface at the time of such mold clamping, the lubricating action based on the solid lubricant is effected on at least one of the third semicylindrical inner peripheral surface and the fourth semicylindrical inner peripheral surface, so that it is possible to avoid direct rotational sliding between the pin and at least one of the third and fourth semicylindrical inner peripheral surfaces, thereby ensuring a safety design.

Circumferentially mutually adjacent ones of such a plurality of other circular holes may be partially overlapped in the circumferential direction with an axially overlapping allowance in a same way as described above.

The metallic base material in accordance with the present invention may further have a plurality of still other circular holes which are formed in at least the fifth semicylindrical inner peripheral surface between another axially adjacent pair of the fifth semicylindrical inner peripheral surface and the sixth semicylindrical inner peripheral surface among the third to the sixth semicylindrical inner peripheral surfaces, and in which the solid lubricant having an exposed surface exposed at the fifth semicylindrical inner peripheral surface is embedded. In this case as well, if the cylindrical inner peripheral surface is developed into a plane, each of the plurality of still other circular holes may have a center at the respective vertex of each of the plurality of second virtual rhombuses formed by the plurality of third virtual line segments which are inclined in the one direction at the predetermined second angle with respect to the circumferential line and extend in parallel in such a manner as to be spaced apart from each other with the predetermined second interval which is 1.5 to 2 times the predetermined first interval, and by the plurality of fourth virtual line segments which are inclined in a symmetrically opposite direction to the one direction about the circumferential line at the second angle with respect to the circumferential line in such a manner as to intersect the third virtual line segments, and extend in parallel in such a manner as to be spaced apart from each other with the second interval. Further, each of the plurality of still other circular holes may have a radius which is greater than one-fourth of the length of an axial diagonal line between the diagonal lines of the second rhombus and is smaller than one-half of the length of the side of the second rhombus. Furthermore, the metallic base material may further have a plurality of further other circular holes which are formed in the sixth semicylindrical inner peripheral surface and in which the solid lubricant having an exposed surface exposed at the sixth semicylindrical inner peripheral surface is embedded, and in this case, if the cylindrical inner peripheral surface is developed into a plane, the plurality of further other circular holes in the fifth semicylindrical inner peripheral surface and the plurality of further other circular holes in the sixth semicylindrical inner peripheral surface may be respectively arranged symmetrically about the circumferential line or point symmetrically with respect to the circumferentially central point of a respective one of the fifth and sixth semicylindrical inner peripheral surfaces. Circumferentially mutually adjacent ones of the plurality of further other circular holes formed in such a fifth or sixth semicylindrical inner peripheral surface may be partially overlapped in the circumferential direction with an axially overlapping allowance. With the bearing bush provided with such a metallic base material, in the same way as the bearing bush provided with the metallic base material having a plurality of other circular holes in which the solid lubricant having an exposed surface exposed at at least one of the third semicylindrical inner peripheral surface and the fourth semicylindrical inner peripheral surface is embedded, in a case where the first semicylindrical inner peripheral surface or the first semicylindrical inner peripheral surface and the second semicylindrical inner peripheral surface are adapted to receive a remarkably large load from the pin occurring due to an increase in the mold closing force at the time of mold clamping, even in the event that the relative rotational sliding with respect to the pin has occurred on at least one of the fifth semicylindrical inner peripheral surface and the sixth semicylindrical inner peripheral surface at the time of such mold clamping, the lubricating action based on the solid lubricant is effected on at least one of the fifth semicylindrical inner peripheral surface and the sixth semicylindrical inner peripheral surface, so that it is possible to avoid direct rotational sliding between the pin and at least one of the fifth and sixth semicylindrical inner peripheral surfaces, thereby ensuring a safety design.

In the present invention, the first and second angles suffice if they are values which enable desired formation of a lubricating film of the solid lubricant on the first to sixth semicylindrical inner peripheral surfaces in the relative rotational sliding with the pin in a range of ±5° or thereabouts, and are preferably from 20° to 45°, more preferably from 25° to 39°.

If the first and second angles are smaller than 20°, the distance between the circumferentially mutually adjacent and embedded pieces of the solid lubricant becomes long, and sufficient lubricating action of the solid lubricant cannot be expected with respect to slight relative rotational motion in the range of ±5° or thereabouts. On the other hand, if the first and second angles exceed 45°, regions where the solid lubricant cannot be embedded increase, and sufficient lubricating action of the solid lubricant cannot be expected, so that a trouble such as seizure can possibly occur.

In the bearing bush for use in a toggle in accordance with the present invention, the solid lubricant is preferably constituted by porous graphite, and the solid lubricant constituted by the porous graphite may be impregnated with a lubricating oil.

If the solid lubricant is impregnated with a lubricating oil, the lubricating action based on the solid lubricant and the lubricating action based on both the lubricant such as grease and the lubricating oil can be used jointly on the cylindrical inner peripheral surface, so that smoother relative rotational sliding with the pin can be expected.

As the plurality of circular holes in which the solid lubricant is embedded in the first to sixth semicylindrical inner peripheral surfaces are provided, as described above, it is possible to maintain the roundness of the metallic base material.

In a preferred example of the present invention, the metallic base material further has in the cylindrical inner peripheral surface thereof three axial grooves formed in such a manner as to extend in the axial direction so as to divide the cylindrical inner peripheral surface into three parts in the circumferential direction and a circumferential groove formed in such a manner as to extend in the circumferential direction so as to divide the cylindrical inner peripheral surface divided into three parts by the axial grooves into at least two parts in the axial direction and to communicate with the axial grooves. In this case, the first to sixth semicylindrical inner peripheral surfaces may be bounded by the three axial grooves and the circumferential groove. If the metallic base material has such axial grooves and a circumferential groove, by using the axial grooves and the circumferential groove as reservoirs for a lubricant such as grease, it is possible to expect the lubricating action based on the lubricant in the reservoirs in addition to the lubricating action based on the solid lubricant, and a large load from the pin can, hence, be supported even more smoothly.

Advantages of the Invention

According to the present invention, it is possible to provide a bearing bush for use in a toggle, which excels in the capability of forming a lubricating film on its relative rotational sliding surface with the pin even in slight rotational motion in the region where a large load from the pin acts due to a remarkable increase in the mold closing force at the time of mold clamping, thereby making it possible to effect smooth relative rotation without causing a trouble such as seizure.

MODES FOR CARRYING OUT THE INVENTION

Figure 1:
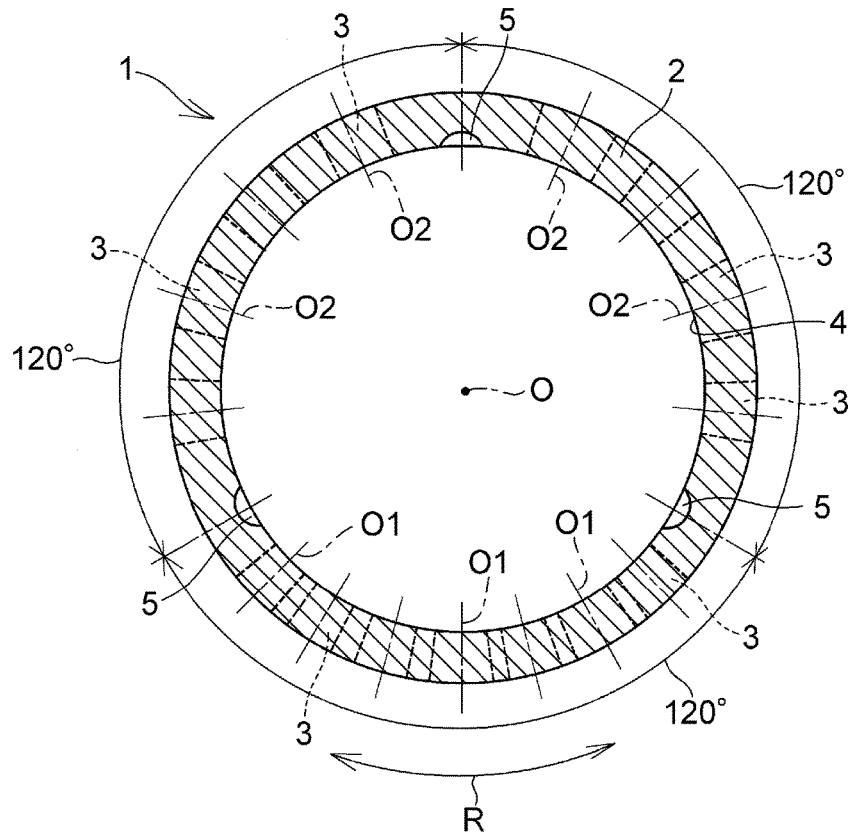
FIG. 1 is an explanatory cross-sectional plan view of a preferred embodiment of the invention.

Next, a detailed description will be given of modes for carrying out the invention. It should be noted that the invention is not limited to these modes for carrying out the invention.

In FIGS. 1 to 4, a bearing bush 1 for use in a toggle in accordance with this embodiment has a cylindrical metallic base material 2 and a solid lubricant 3 embedded in the metallic base material 2. The metallic base material 2 has dead end grooves 5 having a width of 6 mm and a depth of 1 mm, for example, and serving as axial grooves which are used as reservoirs for a lubricant such as grease and are respectively formed in a cylindrical inner peripheral surface 4 in such a manner as to extend in an axial direction X perpendicular to a circumferential direction R, i.e., a direction about an axis O, so as to divide the cylindrical inner peripheral surface 4 into three equal intervals (120° intervals) in the circumferential direction R; an annular groove 6 having a width of 6 mm and a depth of 1 mm, for example, and serving as a circumferential groove which is used as a reservoir for the lubricant such as grease and is formed in the cylindrical inner peripheral surface 4 in such a manner as to extend in the circumferential direction R, so as to divide the cylindrical inner peripheral surface 4 into two equal intervals in the axial direction X and to communicate with the dead end grooves 5; circular holes 7a and 7b as well as 7c and 7d constituted by through holes and formed in each of a pair of semicylindrical inner peripheral surfaces 4a and 4b adjacent to each other in the axial direction X and two pairs of semicylindrical inner peripheral surfaces 4c and 4d sandwiching the pair of semicylindrical inner peripheral surfaces 4a and 4b in the circumferential direction R and adjacent to each other in the axial direction X in each pair in the cylindrical inner peripheral surface 4 divided into three parts in the circumferential direction R by the dead end grooves 5 and divided into two parts in the axial direction X by the annular groove 6; and a chamfered portion 8 formed at each edge in the axial direction X of the cylindrical inner peripheral surface 4. The solid lubricant 3 is embedded in each of the circular holes 7a and 7b as well as 7c and 7d, has an exposed surface 3a flush with and exposed at the cylindrical inner peripheral surface 4, and is constituted by porous graphite impregnated with a lubricating oil.

Figure 2:
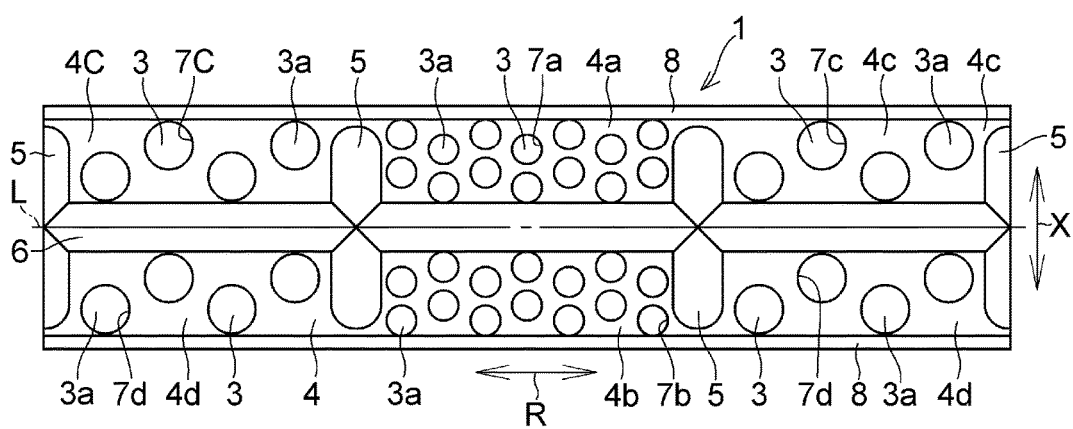
FIG. 2 is an explanatory development view of the bearing bush for use in a toggle in the embodiment of FIG. 1.
Figure 3:
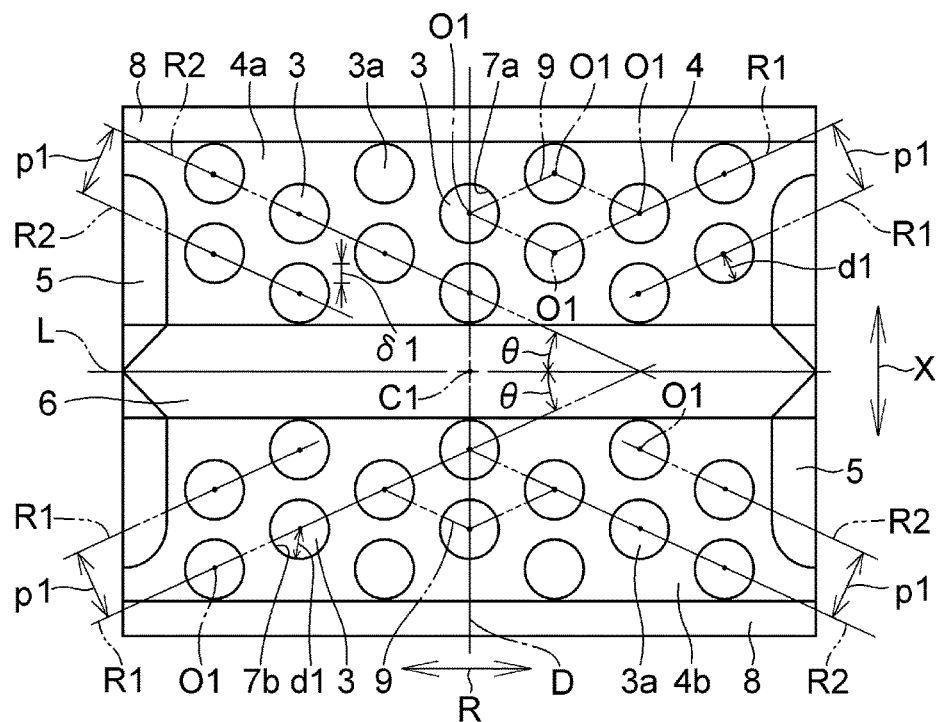
FIG. 3 is an explanatory enlarged plan view of an essential portion of the bearing bush for use in a toggle shown in FIG. 2 in the embodiment of FIG. 1.

In a case where the cylindrical inner peripheral surface 4 is developed into a plane, as shown in FIGS. 2 and 3, each of the circular holes 7a and 7b in the semicylindrical inner peripheral surfaces 4a and 4b has a center O1 at a respective vertex of each of a plurality of virtual rhombuses 9 formed by, on the one hand, a plurality of virtual line segments R1 which are inclined in one direction at an angle of 25° as a predetermined angle θ with respect to a circumferential line L perpendicular to the axial direction X and extending in the circumferential direction R through the center in the axial direction X of the annular groove 6, and extend in parallel in such a manner as to be spaced apart from each other with an equal interval p1, e.g., 5 mm, and, on the other hand, a plurality of virtual line segments R2 which are inclined in a symmetrically opposite direction to the one direction at an angle of 25° as the predetermined angle θ with respect to the circumferential line L in such a manner as to intersect the virtual line segments R1, and extend in parallel in such a manner as to be spaced apart from each other with the equal interval p1. Further, each of the circular holes 7a and 7b in the semicylindrical inner peripheral surfaces 4a and 4b has a radius d1, e.g., a radius of 2 mm, which is greater than one-fourth of the length of a diagonal line in the axial direction X between the diagonal lines of the rhombus 9 and is smaller than one-half of the length of a side of the rhombus 9. Such circular holes 7a and 7b include those whose centers O1 are positioned on a central perpendicular line D perpendicular to the circumferential line L and passing through a central point C1 between the dead end grooves 5 in the circumferential direction R, and those whose centers O1 are positioned symmetrically about the circumferential direction R with the central perpendicular line D as the axis of symmetry. The circular holes 7a in the semicylindrical inner peripheral surface 4a are arranged symmetrically in the axial direction X with respect to the circular holes 7b in the semicylindrical inner peripheral surface 4b with the circumferential line L as the axis of symmetry.

Figure 4:
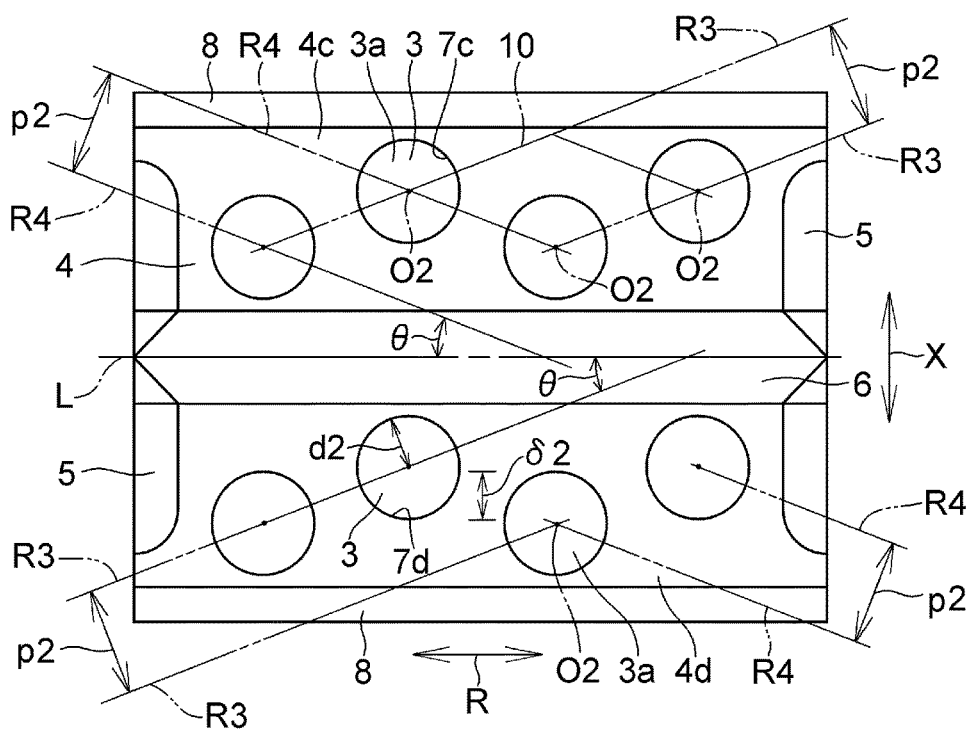
FIG. 4 is another explanatory enlarged plan view of the essential portion of the bearing bush for use in a toggle shown in FIG. 2 in the embodiment of FIG. 1.
Figure 5:
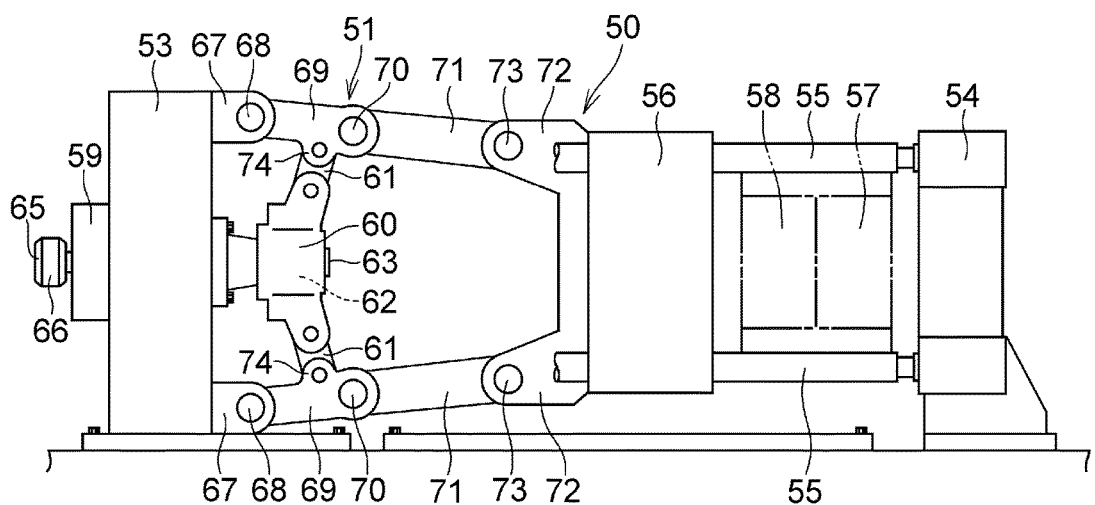
FIG. 5 is an explanatory side view of a toggle type mold clamping apparatus.
Figure 6:
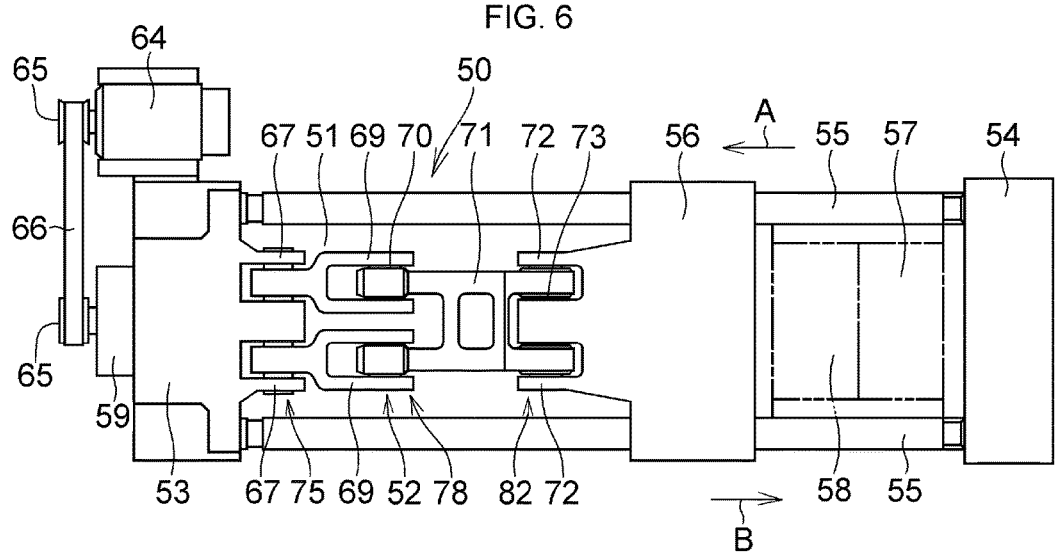
FIG. 6 is an explanatory plan view of the toggle type mold clamping apparatus shown in FIG. 5.
Figure 7:
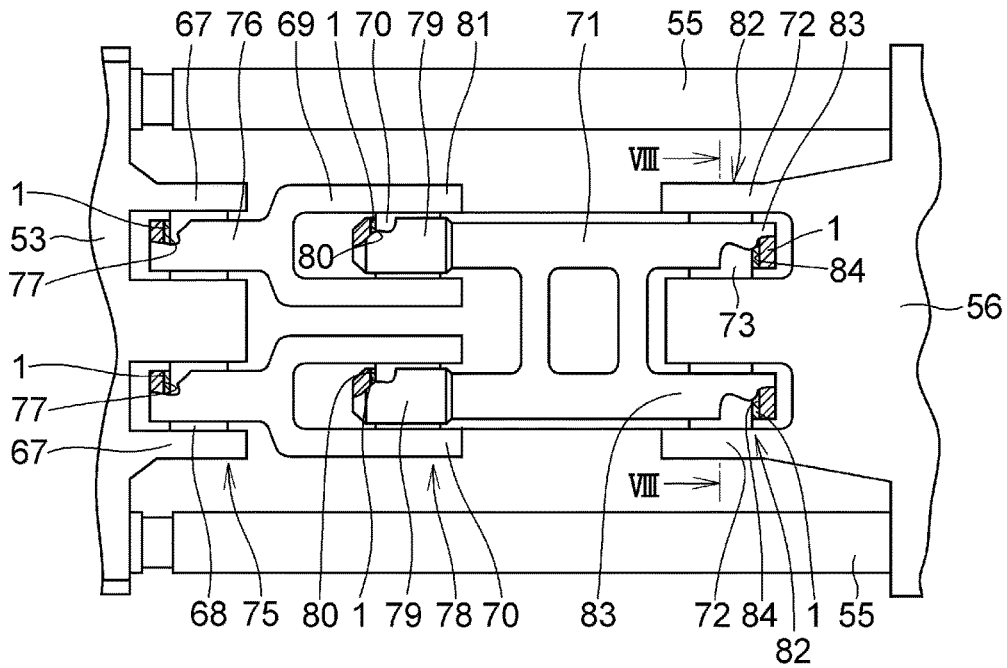
FIG. 7 is an explanatory plan view of an essential portion of the toggle type mold clamping apparatus shown in FIG. 6.
Figure 8:
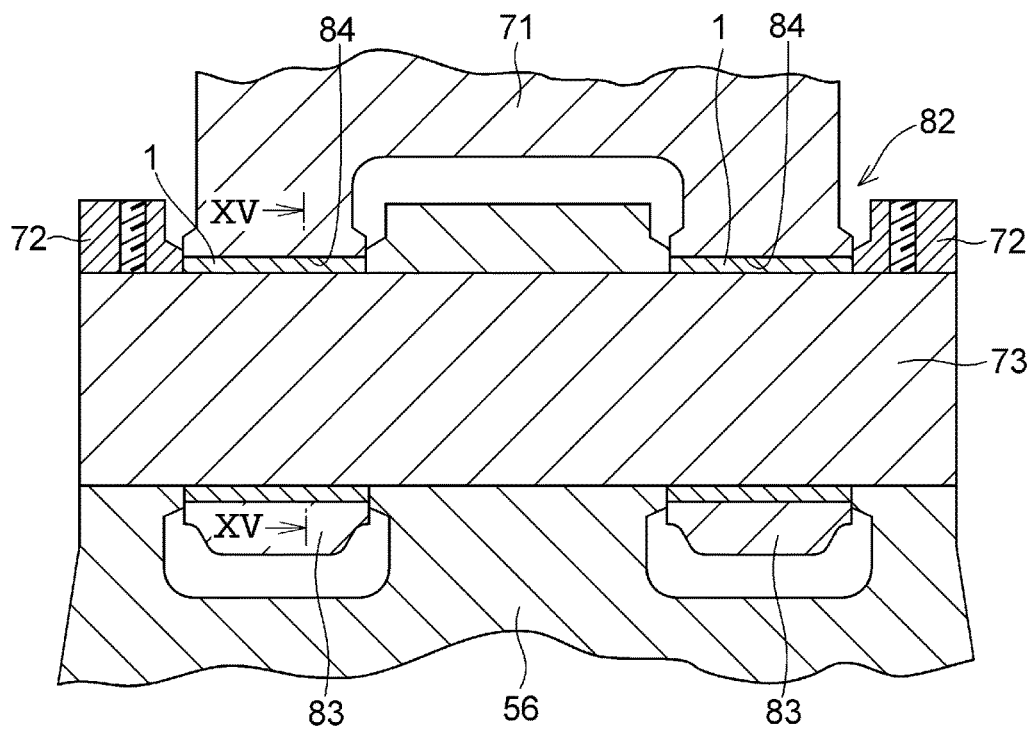
FIG. 8 is an explanatory cross-sectional view taken in the direction of arrows along line VIII-VIII shown in FIG. 7.
Figure 9:
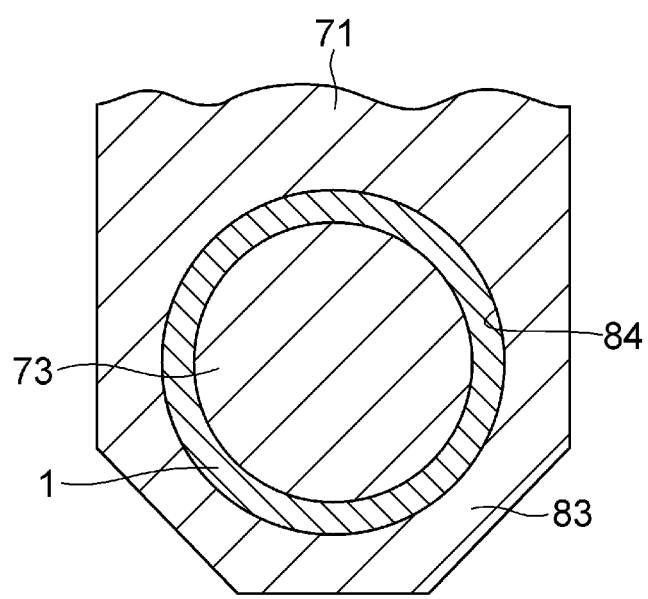
FIG. 9 is an explanatory cross-sectional view taken in the direction of arrows along line IX-IX shown in FIG. 8.

In the case where the cylindrical inner peripheral surface 4 is developed into a plane, as shown in FIGS. 2 and 4, each of the circular holes 7c and 7d in the semicylindrical inner peripheral surfaces 4c and 4d has a center O2 at a respective vertex of each of a plurality of virtual rhombuses 10 formed by, on the one hand, a plurality of virtual line segments R3 which are inclined in one direction at an angle of 25° as the predetermined angle θ with respect to the circumferential line L, and extend in parallel in such a manner as to be spaced apart from each other with an equal interval p2=1.5× p1 to 2×p1, and, on the other hand, a plurality of virtual line segments R4 which are inclined in a symmetrically opposite direction to the one direction at an angle of 25° as the predetermined angle θ with respect to the circumferential line L in such a manner as to intersect the virtual line segments R3, and extend in parallel in such a manner as to be spaced apart from each other with the equal interval p2=1.5×p1 to 2×p1. Further, each of the circular holes 7c and 7d in the semicylindrical inner peripheral surfaces 4c and 4d has a radius d2, e.g., a radius of 3.5 mm, which is greater than one-fourth of the length of a diagonal line in the axial direction X between the diagonal lines of the rhombus 10 and is smaller than one-half of the length of a side of the rhombus 10. Such circular holes 7c and 7d are arranged axially symmetrically using the central point C1 between the dead end grooves 5 in the circumferential direction R as the axis of symmetry.

Among the circular holes 7a and 7b as well as 7c and 7d formed in the semicylindrical inner peripheral surfaces 4a and 4b as well as the semicylindrical inner peripheral surfaces 4c and 4d bounded by the dead end grooves 5, the annular groove 6, and the chamfered portions 8, the circular holes 7a and 7b as well as 7c and 7d adjacent to each other in the circumferential direction R are partially overlapped in the circumferential direction R with overlapping allowances in the axial direction X of δ1=0.1 to 2.0 mm and δ2=0.1 to 3.5 mm, e.g., 1 mm and 2.7 mm, respectively. Thus, the solid lubricant 3 embedded in the circular holes 7a and 7b as well as 7c and 7d also partially overlap with each other at an exposed surface 3a thereof in the circumferential direction R with the overlapping allowances in the axial direction X of δ1 and δ2.

The bearing bush 1, which is comprised of the metallic base material 2 having such a cylindrical inner peripheral surface 4 and having an inside diameter of 45 mm, an outside diameter of 55 mm, and a length in the axial direction X of 34 mm, for example, is used in a joint section 52 of a toggle link mechanism 51 in a toggle type mold clamping apparatus 50 shown in FIGS. 5 to 9.

In the toggle type mold clamping apparatus 50, four tie bars 55 which are disposed by maintaining predetermined intervals with each other in the vertical direction and the transverse direction to couple a rear platen 53 and a fixed platen 54 are mounted between the rear platen 53 and the fixed platen 54. A movable platen 56 is movably disposed so as to approach and move away from the rear platen 53 by using the four tie bars 55 as guides. A fixed-side mold half 57 is mounted on the fixed platen 54, and a movable-side mold half 58 is mounted on the movable platen 56. The rear platen 53 is provided with a mold opening/closing drive unit 59, and a cross head 60 and the rear platen 53, which are advanced and retreated by the mold opening/closing drive unit 59, are coupled to each other by the toggle link mechanism 51, such that as the cross head 60 is advanced and retreated in a direction parallel to the tie bars 55, the movable platen 56 is driven through cross head links 61 and the toggle link mechanism 51, to thereby effect opening/closing and clamping of the movable-side mold half 58 with respect to the fixed-side mold half 57.

The mold opening/closing drive unit 59 for converting rotary motion to linear motion consists of a ball nut 62 assembled to the cross head 60, a ball screw shaft 63 threadedly engaged with the ball nut 62, an electric motor 64 for rotatively driving the ball screw shaft 63, two pulleys 65 for transmitting the driving force of the electric motor 64 to the ball screw shaft 63, and a belt 66 trained between the pulleys 65.

The toggle link mechanism 51 consists of a rotating link 69 connected via a pin 68 to a fixed link 67 formed integrally on the rear platen 53, a rotating link 71 connected to the rotating link 69 through a pin 70, a pin 73 for connecting the rotating link 71 to a fixed link 72 formed integrally on the movable platen 56, a fixed link 74 connected to the midway of the rotating link 69, the cross head 60 connected to the fixed link 74, the ball nut 62 incorporated in the cross head 60, and the ball screw shaft 63 threadedly engaged with the ball nut 62.

The pin 68, which connects the fixed link 67 and the rotating link 69 relatively rotatably and constitutes a first joint portion 75, is fittingly inserted in the bearing bush 1 fitted and fixed to one end portion 76 of the rotating link 69 in a fitting hole 77 of the end portion 76, and is fixed to the fixed link 67. The pin 70, which connects the rotating link 69 and the rotating link 71 relatively rotatably and constitutes a second joint portion 78, is fittingly inserted in the bearing bush 1 fitted to and fixed in a fitting hole 80 of one end portion 79 of the rotating link 71, and is fixed to the other end portion 81 of the rotating link 69. The pin 73, which connects the rotating link 71 and the fixed link 72 relatively rotatably and constitutes a third joint portion 82, is fittingly inserted in the bearing bush 1 fitted to and fixed in a fitting hole 84 of the other end portion 83 of the rotating link 71, and is fixed to the movable platen 56. The rotating links 69 and 71 are made swingable by the joint section 52 constituted by the first, second, and third joint portions 75, 78, and 82, and are able to effect the so-called articular movement.

In the toggle link mechanism 51, when the ball screw shaft 63 is rotated, the ball nut 62 moves in an A direction, and the rotating link 69 and the rotating link 71 mutually rotate, so that the movable platen 56 moves in the A direction, whereas when the ball nut 62 is moved in a B direction by reversely rotating the ball screw shaft 63, the rotating links 69 and 71 mutually rotate reversely, so that the movable platen 56 moves in the B direction.

In the joint section 52 constituted by the first, second, and third joint portions 75, 78, and 82 and serving as a pivotal portion, the respective bearing bushes 1 support the pins 68, 70, 73 slidingly rotatably. As the bearing bushes 1 are respectively fitted and fixed to the end portions 76, 79, and 83 in the fitting holes 77, 80, and 84 thereof in order that a large load from the respective ones of the pins 68, 70, and 73 occurring due to a remarkable increase in the mold closing force at the time of mold clamping can be received by the semicylindrical inner peripheral surfaces 4a and 4b where the exposed surfaces 3a of the solid lubricant 3 are arranged densely in the circumferential direction R with the overlapping allowance δ1 in the circumferential direction R, lubricating films of the solid lubricant 3 are easily formed on the sliding surfaces of the semicylindrical inner peripheral surfaces 4a and 4b and the outer peripheral surfaces of the pins 68, 70, and 73 in the relative rotational sliding in the circumferential direction R of the respective bearing bushes 1 and the pins 68, 70, and 73. Consequently, coupled with the lubricating action at the sliding surfaces of the lubricant such as grease filled in the dead end grooves 5 and the annular groove 6 on the semicylindrical inner peripheral surfaces 4a and 4b, it is possible to smoothly effect slight swinging motion at an angle of ±5° or thereabouts which is accompanied by a large load due to a remarkable increase in the mold closing force at the time of mold clamping, thereby enabling stable mold clamping operation to be achieved without causing a trouble such as seizure on the sliding surfaces.

The bearing bushes 1 are respectively fitted and fixed to the end portions 76, 79, and 83 in the fitting holes 77, 80, and 84 thereof so that the semicylindrical inner peripheral surfaces 4c and 4d are opposed to the outer peripheral surfaces of the pins 68, 70, and 73 other than those outer peripheral surfaces thereof upon which a large load acts at the time of mold clamping. As such, even if rotational sliding occurs between the bearing bushes 1 and the pins 68, 70, and 73, a safety design can be ensured since the lubricating action based on the solid lubricant 3 overlapped with the overlapping allowance δ2 in the circumferential direction R and the lubricating action of the lubricant such as grease filled in the dead end grooves 5 and the annular groove 6 on the semicylindrical inner peripheral surfaces 3a and 3b are exhibited. Thus, stable mold clamping operation can be effected without causing a trouble such as seizure even if a load is applied to the bearing bushes 1. In addition, in the case where the solid lubricant 3 embedded in each of the circular holes 7c and 7d in the semicylindrical inner peripheral surfaces 4c and 4d is impregnated with a lubricating oil, such a solid lubricant 3 also serves as a lubricating oil reservoir for supplying the lubricating oil to the cylindrical inner peripheral surface 3, with the result that not only is the lubricating action exhibited due to lubricating films of the solid lubricant 3 and the lubricant in the dead end grooves 5 and the annular groove 6, but the lubricating action can also be expected due to the lubricating film of the lubricating oil impregnated in the solid lubricant 3.

As described above, with the bearing bush 1, if the metallic base material 2 is disposed with respect to each of the pins 68, 70, and 73 in such a way as to allow the semicylindrical inner peripheral surfaces 4a and 4b to receive the remarkably large load from each of the pins 68, 70, and 73 which is generated due to an increase in the mold closing force at the time of mold clamping, since, in such semicylindrical inner peripheral surfaces 4a and 4b, the centers O1 of the plurality of circular holes 7a and 7b, in which the solid lubricant 3 having the exposed surface 3a exposed at the semicylindrical inner peripheral surfaces 4a and 4b is embedded, are positioned at the respective vertices of the plurality of virtual rhombuses 9, and each of the plurality of circular holes 7a and 7b has the radius d1 which is greater than one-fourth of the length of an axial diagonal line between the diagonal lines of the rhombus 9 and is smaller than one-half of the length of each side of the rhombus 9, the lubricating film of the solid lubricant 3 is easily formed on the semicylindrical inner peripheral surfaces 4a and 4b in the relative rotational sliding in the circumferential direction R in the range of ±5° or thereabouts with each of the pins 68, 70, and 73 under a high load, so that stable mold clamping operation can be effected without causing a trouble such as the seizure of the metallic base material 2 onto each of the pins 68, 70, and 73. Moreover, as the dead end grooves 5 and the annular groove 6 formed on the cylindrical inner peripheral surface 4 are used as reservoirs for the lubricant such as grease, the lubricating action based on the lubricant in the reservoirs can be expected on the semicylindrical inner peripheral surfaces 4a and 4b in addition to the lubricating action based on the solid lubricant 3. Hence, the large load from the respective pins 68, 70, and 73 can be smoothly supported by the semicylindrical inner peripheral surfaces 4a and 4b. Additionally, as a result of the fact that the center O1 of each of the circular holes 7a and 7b with the solid lubricant 3 embedded therein is positioned on the line D passing through the central point C1 and extending in the axial direction X, a maximum load from each of the pins 68, 70, and 73 can be received by the solid lubricant 3 itself embedded in the circular holes 7a and 7b, and it is possible to attain the formation of lubricating films of the solid lubricant 3 on the semicylindrical inner peripheral surfaces 4a and 4b easily and uniformly in the circumferential direction R.

Moreover, with the bearing bush 1, since the circular holes 7a and 7b adjacent to each other in the circumferential direction R among the plurality of circular holes 7a and 7b are partially overlapped in the circumferential direction R with the overlapping allowance in the axial direction X of δ1, such overlaps make it possible to form lubricating films of the solid lubricant 3 uniformly in the circumferential direction R on the semicylindrical inner peripheral surfaces 4a and 4b in the range of the relative rotational sliding in the circumferential direction R of ±5° or thereabouts between each of the pins 68, 70, and 73 and the cylindrical inner peripheral surface 4. Additionally, since, in the same way as the semicylindrical inner peripheral surface 4a, the semicylindrical inner peripheral surface 4b is also provided with the plurality of circular holes 7b with the solid lubricant 3 embedded therein, the high load from each of the pins 68, 70, and 73 can be received in a shared manner by the semicylindrical inner peripheral surfaces 4a and 4b with the lubricating films formed thereon, thereby making it is possible to effect further stable mold clamping operation.

Further, with the bearing bush 1, since the metallic base material 2 has the plurality of circular holes 7c and 7d in which the solid lubricant 3 having the exposed surfaces 3a exposed at the semicylindrical inner peripheral surfaces 4c and 4d is embedded, even in the event that the relative rotational sliding in the circumferential direction R with respect to the pins 68, 70, and 73 has occurred on at least one of the semicylindrical inner peripheral surfaces 4c and 4d at the time of mold clamping, the lubricating action based on the solid lubricant 3 and the lubricating action based on the lubricant such as grease filled in the dead end grooves 5 and the annular groove 6 are effected on at least one of the semicylindrical inner peripheral surfaces 4c and 4d, so that it is possible to avoid direct relatively rotational sliding with at least one of the semicylindrical inner peripheral surfaces 4c and 4d, thereby ensuring a safety design.

Furthermore, with the bearing bush 1, since the plurality of circular holes 7a and 7b as well as 7c and 7d with the solid lubricant 3 embedded therein are uniformly provided in the semicylindrical inner peripheral surfaces 4a, 4b, 4c, and 4d, it is possible to avoid the distortion of the metallic base material 2 caused by the nonuniform arrangement of the circular holes 7a and 7b as well as 7c and 7d, thereby making it possible to maintain the roundness of the metallic base material 2.

DESCRIPTION OF REFERENCE NUMERALS

1: bearing bush
2: metallic base material
3: solid lubricant
3a: exposed surface
4: cylindrical inner peripheral surface
4a, 4b, 4c, 4d: semicylindrical inner peripheral surface
5: dead end groove
6: annular groove
7a, 7b, 7c, 7d: circular hole

The invention claimed is:

1. A bearing bush for use in a toggle and interposed between a pin and a pair of links of a toggle type mold clamping apparatus equipped with a toggle link mechanism having at least the pair of links and the pin for coupling the pair of links relatively rotatably, comprising: a cylindrical metallic base material; and a solid lubricant embedded in the metallic base material, wherein the metallic base material has a plurality of circular holes formed in at least a first semicylindrical inner peripheral surface between the first semicylindrical inner peripheral surface and a second semicylindrical inner peripheral surface which are formed by dividing a cylindrical inner peripheral surface of the metallic base material into three parts in a circumferential direction and dividing the same into two parts in an axial direction, and which are adjacent to each other in the axial direction, a solid lubricant having an exposed surface exposed at the first semicylindrical inner peripheral surface being embedded in each of the plurality of circular holes, and wherein, if the cylindrical inner peripheral surface is developed into a plane, each of the plurality of circular holes has a center at a respective vertex of each of a plurality of virtual rhombuses formed by a plurality of first virtual line segments which are inclined in one direction at a predetermined first angle with respect to a circumferential line perpendicular to the axial direction and extending in the circumferential direction, and extend in parallel in such a manner as to be spaced apart from each other with a predetermined first interval, and by a plurality of second virtual line segments which are inclined in a symmetrically opposite direction to the one direction about the circumferential line at the first angle with respect to the circumferential line in such a manner as to intersect the first virtual line segments, and extend in parallel in such a manner as to be spaced apart from each other with the first interval, each of the plurality of circular holes having a radius which is greater than one-fourth of a length of an axial diagonal line between diagonal lines of the rhombus and is smaller than one-half of a length of a side of the rhombus.

2. The bearing bush for use in a toggle according to claim 1, wherein, if the cylindrical inner peripheral surface is developed into a plane, each of one first virtual line segment of the plurality of first virtual line segments and one second virtual line segment of the plurality of second virtual line segments passes through a circumferentially central point of the first semicylindrical inner peripheral surface on the circumferential line.

3. The bearing bush for use in a toggle according to claim 1, wherein circumferentially mutually adjacent ones of the plurality of circular holes are partially overlapped in the circumferential direction with an axially overlapping allowance.

4. The bearing bush for use in a toggle according to claim 1, wherein the metallic base material further has a plurality of circular holes which are formed in the second semicylindrical inner peripheral surface and in which the solid lubricant having an exposed surface exposed at the second semicylindrical inner peripheral surface is embedded, and, if the cylindrical inner peripheral surface is developed into a plane, the plurality of circular holes in the first semicylindrical inner peripheral surface and the plurality of circular holes in the second semicylindrical inner peripheral surface are respectively arranged symmetrically about the circumferential line or point symmetrically with respect to the circumferentially central point of a respective one of the first and second semicylindrical inner peripheral surfaces.

5. The bearing bush for use in a toggle according to claim 4, wherein circumferentially mutually adjacent ones of the plurality of circular holes formed in the second semicylindrical inner peripheral surface are partially overlapped in the circumferential direction with an axially overlapping allowance.

6. The bearing bush for use in a toggle according to claim 1, wherein the first angle is from 20° to 45°.

7. The bearing bush for use in a toggle according to claim 1, wherein the first angle is from 25° to 39°.

8. The bearing bush for use in a toggle according to claim 1, wherein the metallic base material further has a plurality of other circular holes formed in at least a third semicylindrical inner peripheral surface between at least one axially adjacent pair of the third semicylindrical inner peripheral surface and a fourth semicylindrical inner peripheral surface among the third to a sixth semicylindrical inner peripheral surface which are formed in such a manner as to sandwich the first and second semicylindrical inner peripheral surfaces in the circumferential direction and by dividing the cylindrical inner peripheral surface of the metallic base material into three parts in the circumferential direction and dividing the same into two parts in the axial direction, the solid lubricant having an exposed surface exposed at the third semicylindrical inner peripheral surface being embedded in each of the plurality of other circular holes, and wherein, if the cylindrical inner peripheral surface is developed into a plane, each of the plurality of other circular holes has a center at a respective vertex of each of a plurality of second virtual rhombuses formed by a plurality of third virtual line segments which are inclined in the one direction at a predetermined second angle with respect to the circumferential line and extend in parallel in such a manner as to be spaced apart from each other with a predetermined second interval which is 1.5 to 2 times the predetermined first interval, and by a plurality of fourth virtual line segments which are inclined in a symmetrically opposite direction to the one direction about the circumferential line at the second angle with respect to the circumferential line in such a manner as to intersect the third virtual line segments, and extend in parallel in such a manner as to be spaced apart from each other with the second interval, each of the plurality of other circular holes having a radius which is greater than one-fourth of a length of an axial diagonal line between diagonal lines of the second rhombus and is smaller than one-half of a length of a side of the second rhombus.

9. The bearing bush for use in a toggle according to claim 8, wherein circumferentially mutually adjacent ones of the plurality of other circular holes are partially overlapped in the circumferential direction with an axially overlapping allowance.

10. The bearing bush for use in a toggle according to claim 8, wherein the metallic base material further has a plurality of other circular holes which are formed in the fourth semicylindrical inner peripheral surface and in which the solid lubricant having an exposed surface exposed at the fourth semicylindrical inner peripheral surface is embedded, and, if the cylindrical inner peripheral surface is developed into a plane, the plurality of other circular holes in the third semicylindrical inner peripheral surface and the plurality of other circular holes in the fourth semicylindrical inner peripheral surface are respectively arranged symmetrically about the circumferential line or point symmetrically with respect to the circumferentially central point of a respective one of the third and fourth semicylindrical inner peripheral surfaces.

11. The bearing bush for use in a toggle according to claim 10, wherein circumferentially mutually adjacent ones of the plurality of other circular holes formed in the fourth semicylindrical inner peripheral surface are partially overlapped in the circumferential direction with an axially overlapping allowance.

12. The bearing bush for use in a toggle according to claim 8, wherein the metallic base material further has a plurality of still other circular holes which are formed in at least the fifth semicylindrical inner peripheral surface between another axially adjacent pair of the fifth semicylindrical inner peripheral surface and the sixth semicylindrical inner peripheral surface among the third to the sixth semicylindrical inner peripheral surfaces, and in which the solid lubricant having an exposed surface exposed at the fifth semicylindrical inner peripheral surface is embedded, and wherein, if the cylindrical inner peripheral surface is developed into a plane, each of the plurality of still other circular holes has a center at the respective vertex of each of the plurality of second virtual rhombuses formed by the plurality of third virtual line segments which are inclined in the one direction at the predetermined second angle with respect to the circumferential line and extend in parallel in such a manner as to be spaced apart from each other with the predetermined second interval which is 1.5 to 2 times the predetermined first interval, and by the plurality of fourth virtual line segments which are inclined in a symmetrically opposite direction to the one direction about the circumferential line at the second angle with respect to the circumferential line in such a manner as to intersect the third virtual line segments, and extend in parallel in such a manner as to be spaced apart from each other with the second interval, each of the plurality of still other circular holes having a radius which is greater than one-fourth of the length of an axial diagonal line between the diagonal lines of the second rhombus and is smaller than one-half of the length of the side of the second rhombus.

13. The bearing bush for use in a toggle according to claim 12, wherein circumferentially mutually adjacent ones of the plurality of still other circular holes are partially overlapped in the circumferential direction with an axially overlapping allowance.

14. The bearing bush for use in a toggle according to claim 12, wherein the metallic base material further has a plurality of further other circular holes which are formed in the sixth semicylindrical inner peripheral surface and in which the solid lubricant having an exposed surface exposed at the sixth semicylindrical inner peripheral surface is embedded, and, if the cylindrical inner peripheral surface is developed into a plane, the plurality of further other circular holes in the fifth semicylindrical inner peripheral surface and the plurality of further other circular holes in the sixth semicylindrical inner peripheral surface are respectively arranged symmetrically about the circumferential line or point symmetrically with respect to the circumferentially central point of a respective one of the fifth and sixth semicylindrical inner peripheral surfaces.

15. The bearing bush for use in a toggle according to claim 14, wherein circumferentially mutually adjacent ones of the plurality of further other circular holes formed in the sixth semicylindrical inner peripheral surface are partially overlapped in the circumferential direction with an axially overlapping allowance.

16. The bearing bush for use in a toggle according to claim 8, wherein the second angle is from 20° to 45°.

17. The bearing bush for use in a toggle according to claim 8, wherein the second angle is from 25° to 39°.

18. The bearing bush for use in a toggle according to claim 1, wherein the solid lubricant is constituted by porous graphite.

19. The bearing bush for use in a toggle according to claim 18, wherein the solid lubricant is impregnated with a lubricating oil.

20. The bearing bush for use in a toggle according to claim 1, wherein the metallic base material further has in the cylindrical inner peripheral surface thereof three axial grooves formed in such a manner as to extend in the axial direction so as to divide the cylindrical inner peripheral surface into three parts in the circumferential direction and a circumferential groove formed in such a manner as to extend in the circumferential direction so as to divide the cylindrical inner peripheral surface divided into three parts by the axial grooves into at least two parts in the axial direction and to communicate with the axial grooves, the first to sixth semicylindrical inner peripheral surfaces being bounded by the three axial grooves and the circumferential groove.

\* \* \* \* \*